March 19, 1935.  B. F. STENZ ET AL  1,994,543
DISPLAY DEVICE
Original Filed June 20, 1931  2 Sheets-Sheet 1
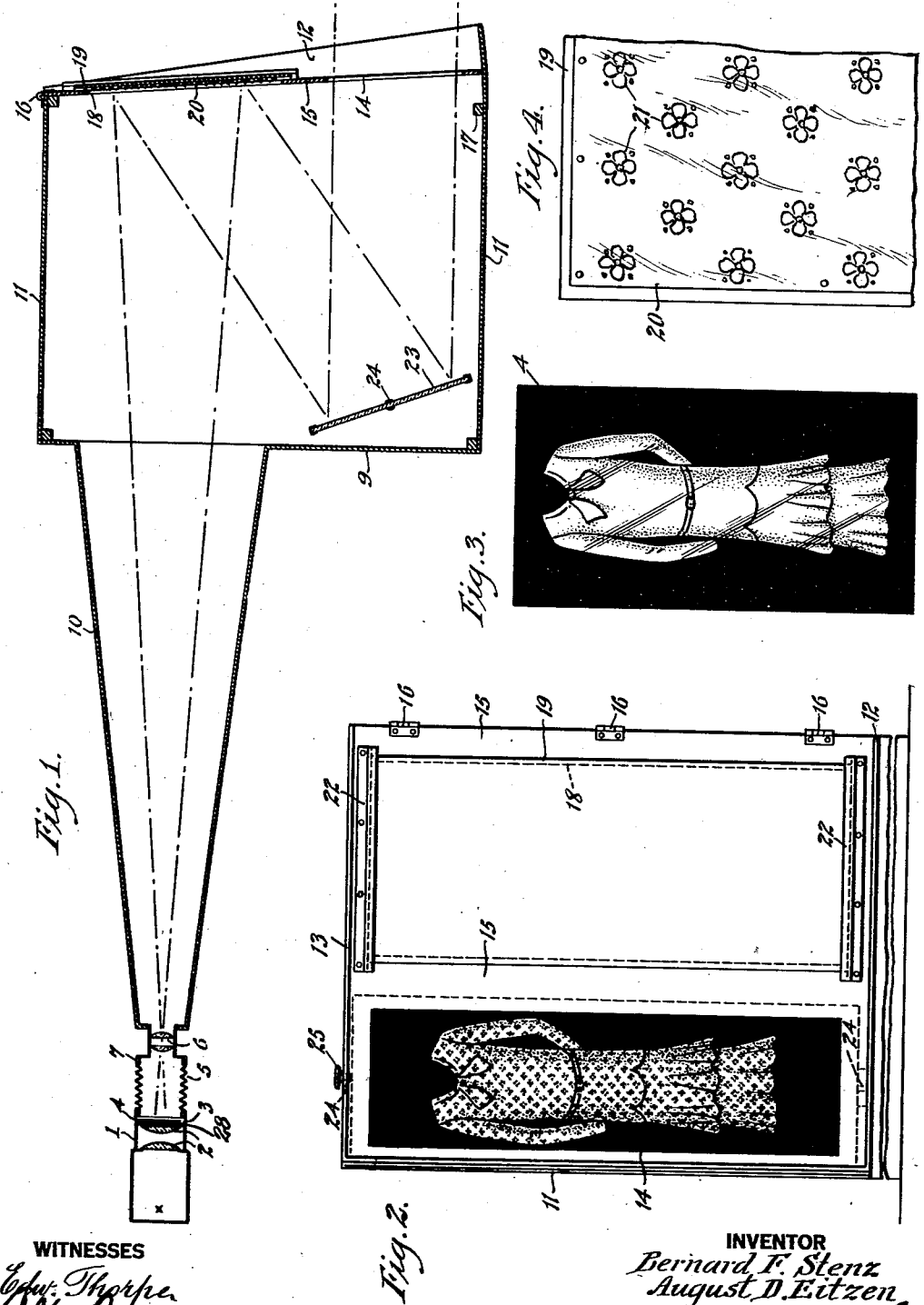
WITNESSES
INVENTOR
Bernard F. Stenz
August D. Eitzen
BY
ATTORNEY March 19, 1935.　　　B. F. STENZ ET AL　　　1,994,543
DISPLAY DEVICE
Original Filed June 20, 1931　　2 Sheets-Sheet 2

WITNESSES
Edw. Thorpe

INVENTOR
Bernard F. Stenz
August D. Eitzen
BY
ATTORNEY

Patented Mar. 19, 1935

1,994,543

UNITED STATES PATENT OFFICE 1,994,543

DISPLAY DEVICE

Bernard F. Stenz, New York, and August D. Eitzen, Rockville Centre, N. Y., assignors to Simplex Pattern Projection Corporation, New York, N. Y., a corporation of Delaware Application June 20, 1931, Serial No. 545,814
Renewed August 2, 1934

9 Claims. (Cl. 88—24)

The present invention relates to a display device and more particularly to an apparatus which may be appropriately termed a "visualizer", and it has for its object to enable one to determine beforehand how a certain object will appear when manufactured of a certain patterned material.

To accomplish this, the present invention comprises a projector and a screen (the latter displaying on its receiving surface the patterned material in full size), and a miniature transparent outline picture which is introduced between the projector and the screen, so that the picture is projected in magnified form or full size on the patterned material of the screen; the patterned material thereon cooperating and combining with the projected picture to show the object as though it were made of that particular patterned material; for instance, in the illustrated embodiment, a picture of a woman's dress or gown.

The present invention therefore, may be said to consist broadly of an apparatus comprising a projector, a patterned screen, and a transparent outline picture introduced between the projector and the screen, and it further consists of the devices and combinations of devices which will be hereinafter described and claimed.

The invention is illustrated in the accompanying drawings, in which

Figure 1 shows a horizontal, sectional view of one form of the apparatus;

Figure 2 shows a front elevation looking from the right hand end of Figure 1;

Figure 3 shows a front view, practically full size, of a film carrying a transparent outline picture of a woman's dress or gown;

Figure 4 shows a front elevation of a portion of the patterned screen, the pattern of the fabric or material affixed thereto being of full size;

Figure 5:
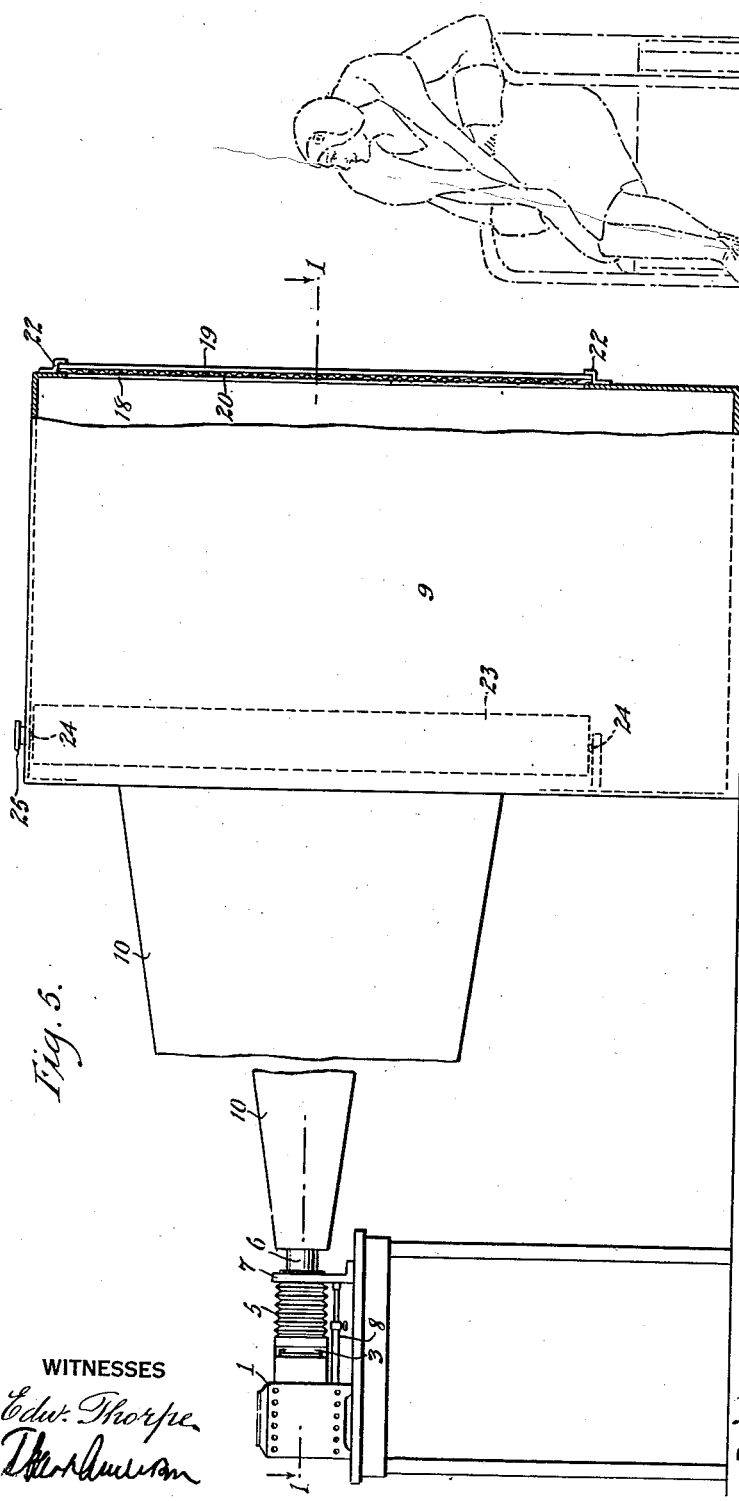
Figure 5 shows in broken side elevation one form of the apparatus, the portions at the right hand end being shown in vertical section and other parts being shown in dotted line.

The apparatus comprises a projector which may be of any suitable construction, and having a light condenser 1, carrying the usual lens 2, a slide recess 3 to receive the slide 4, the usual accordion type of focusing connection 5, and the magnifying lens 6 supported by a sliding bracket 7, and may also embody an adjustable brace 8. All of these parts may be of the usual or commercial construction, operating to concentrate the rays of light in the condenser, to pass them through the slide 4 and to magnify the picture carried by the slide and project it upon the surface of the screen.

The apparatus as shown, further consists of a cabinet or receiving chamber 9, which may be made of any suitable material and of any shape, which cabinet is connected to the projector by means of an extension 10 leading from the rear wall of the cabinet 9 and of sufficient length, considering the size of the film to be projected, to position the projector and film at the required distance from the screen to produce the proper focus and the desired size and sharpness of the picture projected on the screen. The cabinet 9 has side walls 11, a base wall 12, and a top 13, and excepting for the visualizing opening 14 and the screen opening in the front of the cabinet 9, the interior of the cabinet 9 and its extension 10 are entirely closed from ordinary light rays when in use, and will be preferably painted black upon the inner surfaces. Of course there will be a light aperture leading into the extension 10 from the projector.

The front of the cabinet may be in the form of a swinging door 15, hinged at 16 at the right, so that it may swing towards and from a stop 17. In addition to the visualizing opening 14 it is provided with an opening 18 to receive a panel 19 upon the front of which is carried the screen 20 showing a pattern as 21. The patterned surface of the screen may consist of a piece of patterned material of which the object shown in the projected picture may be made. At the upper and lower edges of the opening 18 at the front 15 are guides or cleats 22 into which the lower and upper edges of the screen panel may slide, so that the screen may be readily removed and another with a different patterned screen surface substituted therefor as required.

Mounted within the cabinet 9 is a reflecting mirror 23, of a suitable length and width, and is so positioned that it is visible through the opening 14 in the door 15 of the cabinet, so that the observer, sitting or standing in front of the cabinet (as indicated in dotted lines in Figure 5), may see in the mirror the reflected picture which has been projected onto the screen as indicated in Figure 2. The mirror may be adjustably supported so as to swing about the points 24, and be provided at its upper end with a knob 25, whereby its relative angular position with regard to the screen 20 may be adjusted without entering the cabinet; also, as indicated, the relative angular position of the mirror 23 and the screen may be varied by slightly moving the front of the cabinet about the hinged connections and one or both of these adjustments may be employed. This relatively lateral, angular adjustment of the mirror and screen causes the reflected picture as seen in the mirror to be enlarged or reduced laterally, and thus, assuming that the reflected picture is a woman's dress or gown, it may be shown as it would look if made for a slim woman or a stout woman.

It will be understood that by any suitable means, as by painting on a thin transparent film an opaque background or field defining the outline picture, as indicated in Figures 2 and 3, no light excepting that which passes through the transparent outline picture will pass through, and thus the outline picture and the pattern of the screen within the projected picture is the only thing observable on the patterned screen; the field of the screen outside of the reflected picture being blotted out by the opaque field of the film. The picture of course may be observed by looking directly at the screen, assuming that the projection is made in a darkened room, or, as in the illustrations, the picture on the screen may be observed by the reflection in the mirror, and, in either case, the composite picture will be shown approximately in full size, or of such size as will appropriately show an article such as a garment or a dress, made of a certain patterned material.

Figure 6:
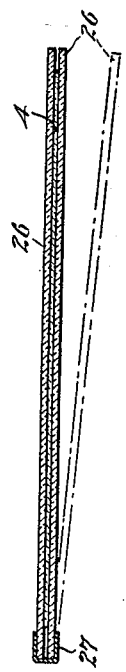
Figure 6 shows a horizontal, sectional view of a transparent slide which may be employed to receive and support the film shown in Figure 3.

In Figure 6 we have shown a convenient slide which consists of two transparent plates of glass 26, or other rigid transparent material suitable for the purpose, and they are connected along one edge by a flexible hinge 27, so that they may be opened as indicated in dotted lines in Figure 6, and the film 4, upon which appears the transparent outline picture, placed between the plates 26, constituting a slide which may be inserted in the space 3 between the light condenser and the magnifying lens.

Preferably as shown in Fig. 1, a filter 28 composed of some suitable transparent colored substance is disposed between the slide 4 and the light condenser 1 to absorb any objectionable light rays.

We have not pretended in the specification to set forth a comprehensive statement of all the uses to which our invention may be put, nor is it to be understood that the illustrated embodiment is in any sense to be regarded as a limitation of our invention. In its simplest form, the essential features of our invention may be said to be a projector, a screen of patterned material, and a miniature transparent outline picture interposed between the projector and the patterned screen, so that the screen and the picture co-operate to form a projected picture of substantially full size, of any article, when made of a certain patterned material.

It is believed that the operation of the present invention has been sufficiently described in connection with the foregoing description of its construction and organization, and that a further description of the operation is unnecessary.

It is to be understood that the term "outline transparent picture" is intended to describe not only the construction shown, in which the picture is formed by painting or printing on a transparent plate or film an opaque "field", but any arrangement whereby the picture, through which the projected light may pass, is defined by an opaque and light excluding "field", such as a stencil cut from suitable opaque sheet material; also, the term "screen" is to be understood to include not only the form of screen shown and described, but a piece of actually patterned fabric or material, as for instance, a length of cloth from a bolt of cloth, or rolls of wall paper, and the like, which may be supported over the opening 18 in the door 15, in lieu of the slide 19.

It is to be understood of course, that in Figure 2 the reflected picture, although in the drawings apparently the same size as that shown in Figure 3, is really very much magnified, and to such an extent as to show the observer a full size garment, with the pattern of the material in full size, but which of course, in Figure 2, is very much reduced in size as compared with the actual size of the garment.

Instead of employing the relatively adjustable screen and mirror to vary the lateral dimensions of the projected picture the same result may be accomplished by providing the slide or film with a plurality of outline pictures varying in size laterally; thus a slide having three pictures, each of a different lateral dimension, for instance, a dress for a "slim", a "medium", or a "stout" figure, and by laterally adjusting the slide any of the pictures thereon may be projected onto the screen.

In the operation of the apparatus as shown and described, the condensed light rays of the projector pass through the usual lens not only of the condenser but the objective lens, and through the slide or image producing device interposed between the lens of the condenser and the objective lens, and thence through an aperture in the extension of the cabinet or housing, projecting the picture in life size, as it were, onto the patterned surface of the screen, which is reflected by the mirror, and because of the filtering of the light rays and the absorbing of the objectionable light rays, the image shown on the screen and reflected in the mirror will show only the patterned object, such as a dress, free of objectionable colors.

We claim as our invention:

1. In a device for displaying a patterned material in its full size relation to a full sized wearing apparel design, the combination with a support for a length of the patterned material to be displayed at least the length of the full sized wearing apparel in relation to which the patterned material is to be observed, of a slide having formed thereon an outline of a wearing apparel design defined from the remainder of the slide by an opaque field, and a projector for directing a light beam through said slide to produce on said patterned material a full sized reproduction of the wearing apparel design with the remainder of the patterned material blocked out by said opaque field.

2. In a device for displaying a patterned material in its full size relation to a full sized wearing apparel design, the combination with a support for a length of the patterned material to be displayed at least the length of the full sized wearing apparel in relation to which the patterned material is to be observed, of a slide having formed thereon an outline of a wearing apparel design defined from the remainder of the slide by an opaque field, a projector for directing a light beam through said slide to produce on said patterned material a full sized reproduction of the wearing apparel design with the remainder of the patterned material blocked out by said opaque field, and a reflector out of the path of the light beam from said projector to said patterned material for reflecting the patterned material and wearing apparel design as a unitary reproduction of the wearing apparel design selected composed of the patterned material displayed.

3. In a device for displaying a patterned material in its full size relation to a full sized apparel design, the combination with a support for a length of the patterned material to be displayed at least the length of the full sized wearing apparel in relation to which the patterned material is to be observed, of a slide having formed thereon an outline of a wearing apparel design, a projector for directing a beam of light through said slide to produce on said patterned material a full sized reproduction of the wearing apparel design, and a reflector out of the path of the light beam from said projector to said patterned material and reflecting the patterned material and wearing apparel design as a unitary full-sized reproduction of the wearing apparel design selected composed of the patterned material displayed.

4. In a device for displaying a patterned material in its full size relation to a full sized wearing apparel design, the combination with a support for a length of the patterned material to be displayed at least the length of the full sized wearing apparel in relation to which the patterned material is to be observed, of a slide having formed thereon an outline of a wearing apparel design defined from the remainder of the slide by an opaque field, a projector for directing a light beam through said slide to produce on said patterned material a full sized reproduction of the wearing apparel design with the remainder of the patterned material blocked out by said opaque field, a reflector out of the path of the light beam from said projector to said patterned material for reflecting the patterned material and wearing apparel design as a unitary reproduction of the wearing apparel design selected composed of the patterned material displayed, and a filter in said projector associated with said slide to absorb objectionable light rays.

5. In a device for displaying a patterned material in its full sized relation to a full sized apparel design, the combination with a cabinet having a rectangular housing, one of the walls of said housing having a support and window disposed adjacent to one another, another wall of said housing having an opening in alinement with said support, and a reflector in alinement with said window, said cabinet having an elongated extension registering with the opening in said second named wall, a projector at the outer end of said extension, said support being large enough to support a length of the patterned material to be displayed at least the length of the full sized wearing apparel in relation to which the patterned material is to be observed, a slide in said projector having formed thereon an outline of a wearing apparel design, said projector directing a beam of light through said slide for reproducing on the patterned material mounted on said support a full sized reproduction of the wearing apparel design formed on said slide, and said reflector being disposed at an angle to said patterned material and to said window to reproduce at said window a mirrored reflection of the patterned material with an image of the wearing apparel design imposed thereon.

6. In a device for displaying a patterned material in its full size relation to a full sized apparel design, the combination with a cabinet having a rectangular housing, one of the walls of said housing having a support and window disposed adjacent to one another, another wall of said housing having an opening in alinement with said support, and a reflector in alinement with said window, said cabinet having an elongated extension registering with the opening in said second named wall, a projector at the outer end of said extension, said support being large enough to support a length of the patterned material to be displayed at least the length of the full sized wearing apparel in relation to which the patterned material is to be observed, a slide in said projector having formed thereon an outline of a wearing apparel design, said projector directing a beam of light through said slide for reproducing on the patterned material mounted on said support a full sized reproduction of the wearing apparel design formed on said slide, said reflector being disposed at an angle to said patterned material and to said window to reproduce at said window a mirrored reflection of the patterned material with an image of the wearing apparel design imposed thereon, said support comprising an open frame whereby one face of the patterned material will be presented to the projector and the other face exposed to view adjacent to said window whereby an observer can inspect the mirrored reflection and the reverse side of the patterned screen without change of position.

7. In a device for displaying a patterned material in its full size relation to a full sized wearing apparel design, the combination with a support for a length of the patterned material to be displayed at least the length of the full sized wearing apparel in relation to which the patterned material is to be observed, of a light transmitting master having formed thereon an outline of a wearing apparel design defined from the remainder of the master by a light obstructing field, and a projector for directing a light beam through said master to produce on said patterned material a full sized reproduction of the wearing apparel design with the remainder of the patterned material blocked out by said light obstructing field.

8. In a device for displaying a patterned material, the combination with a support for a length of the patterned material to be displayed, of a light transmitting master having formed thereon an outline of a wearing apparel design defined from the remainder of the master by a light obstructing field, a projector for directing a light beam through said master to produce on a light patterned material a reproduction of the wearing apparel design with the remainder of the patterned material blocked out by said light obstructing field, and a reflector out of the path of the light beam from said projector to said patterned material for reflecting the patterned material and wearing apparel design as a unitary reproduction of the wearing apparel design selected composed of the patterned material displayed.

9. In a device for displaying a patterned material, the combination with a support for a length of the patterned material to be displayed, of a master having formed thereon an outline of a wearing apparel design, a projector for directing a beam of light through said master to produce on said patterned material a reproduction of the wearing apparel design, and a reflector out of the path of the light beam from said projector to said patterned material for reflecting the patterned material and wearing apparel design as a unitary reproduction of the wearing apparel design selected composed of the patterned material displayed.

BERNARD F. STENZ.
AUGUST D. EITZEN.